United States Patent [19]

Mak

[11] Patent Number: 5,791,777
[45] Date of Patent: Aug. 11, 1998

[54] SPATULA ATTACHMENT FOR A MIXER

[75] Inventor: Chi Kin Mak, Wan Chan, Hong Kong

[73] Assignee: Windmere-Durable Holdings, Inc., Miami Lakes, Fla.

[21] Appl. No.: 788,291

[22] Filed: Jan. 24, 1997

[51] Int. Cl.$^6$ .................................................. A47J 43/00
[52] U.S. Cl. .................................... 366/129; 366/309
[58] Field of Search ........................... 366/129, 130, 366/309, 312, 344, 347, 349, 197; 99/348; D7/376, 379, 380

[56] References Cited

U.S. PATENT DOCUMENTS

| | | |
|---|---|---|
| D. 332,722 | 1/1993 | Torbet et al. . |
| 1,415,735 | 5/1922 | Trust et al. ............... 366/309 X |
| 2,104,268 | 1/1938 | Nielsen . |
| 2,562,790 | 7/1951 | Houston, Jr. . |
| 2,753,160 | 7/1956 | Gunn, Sr. . |
| 3,415,497 | 12/1968 | Johnson ..................... 366/309 X |
| 3,913,896 | 10/1975 | Hawke ........................... 366/347 |
| 4,575,255 | 3/1986 | Kafka . |
| 4,854,717 | 8/1989 | Crane et al. . |
| 4,946,285 | 8/1990 | Vennemeyer ............... 366/309 X |
| 5,556,201 | 9/1996 | Veltrop et al. ............. 366/312 X |
| 5,556,203 | 9/1996 | Filias ........................... 366/347 |

FOREIGN PATENT DOCUMENTS 246926  2/1926  United Kingdom ............ 366/309

*Primary Examiner*—Charles E. Cooley
*Attorney, Agent, or Firm*—Dickstein Shapiro Morin & Oshinsky LLP

[57] ABSTRACT

An improved spatula attachment for use with a hand-held electric mixer and more particularly a spatula attachment with a pair of prongs that connect directly to the mixer's body. The spatula attachment has a spatula portion connected to a base. A pair of slots are formed in the base allowing the beater stems to extend past the base. Two prongs extend from the base and each prong has a gripping portion formed at the end opposite the base. These gripping portions are designed to attach directly to the body of the mixer.

9 Claims, 8 Drawing Sheets

SPATULA ATTACHMENT FOR A MIXER

BACKGROUND

The present invention relates to a spatula attachment for use with a hand-held electric mixer and more particularly to a spatula attachment with a pair of prongs that connect directly to the mixer's body.

Hand-held electric mixers are a common kitchen appliance used to mix or beat together food ingredients in a bowl. Such mixers have at least one rotating beater stem which rotates at a high speed when the mixer is turned on. The stem has a head, often formed from several loops of wire, to more effectively mix the ingredients inside the bowl. Many mixers have two beaters which interact to better mix together the food.

As the beater heads rotate, food at the center of the bowl will become thoroughly mixed. Some food, however, migrates to the sides of the bowl and avoids being mixed by the beater heads. To avoid this, it is known to use a spatula attachment with the mixer. This allows a user to scrape food from the side of the bowl as it is being mixed. Such an attachment is shown in U.S. Pat. No. Des. 332,722.

These spatula attachments have several disadvantages. The mixer body and beater stems tend to vibrate due to the stems' high-speed rotation. Because known spatula attachments connect to the beater stems, they can become loose, or even entirely detached. Moreover, a large amount of force can be generated when a user presses the spatula portion against the side of a bowl in attempt to scrape off food. This force can also loosen or detach the spatula attachment.

Known spatula attachments are also cumbersome to attach and remove from the beater stems. Because the spatula attachment connects to the beater stems, it has two long passages through which the stems pass. These long passages make it difficult for a user to connect the attachment to the stems. This is especially true because one hand must grip the mixer when attaching the spatula.

SUMMARY

The present invention alleviates to a great extent these disadvantages by providing a spatula attachment that connects to the body of a hand-held electric mixer.

In one aspect of the present invention, the spatula attachment has a spatula portion connected to a base. A pair of slots are formed in the base allowing the beater stems to extend past the base. Two prongs extend from the base and each prong has a gripping portion formed at the end opposite the base. These gripping portions are designed to attach directly to the body of the mixer.

It is an object of the present invention to provide an improved spatula attachment for a hand-held electric mixer.

It is another object of the present invention to provide an improved spatula attachment that will not become loosened or detached from the mixer due to vibrations or external forces.

It is another object of the present invention to provide an improved spatula attachment that is easy to connect and detach from the mixer body.

Other objects and advantages of the present invention will be readily apparent from the following description and drawings which illustrate a preferred embodiment of the invention.

DETAILED DESCRIPTION OF A PREFERRED EMBODIMENT

Figure 1:
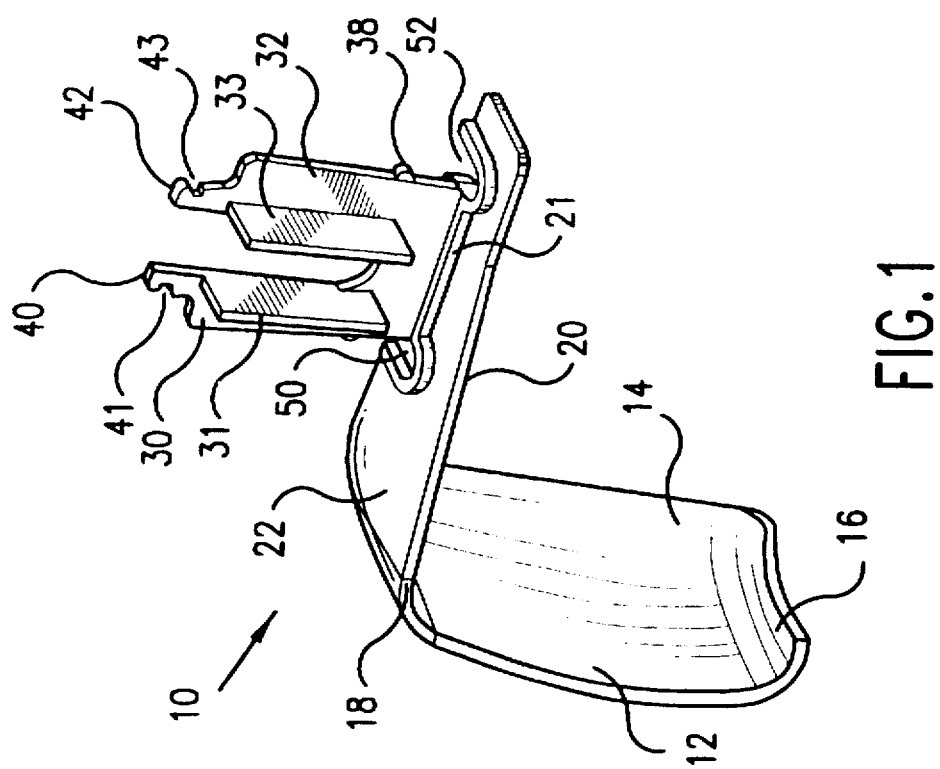
FIG. 1 is a perspective view of a spatula attachment according to a preferred embodiment of the present invention.

Refer now to FIG. 1, there being shown a perspective view of a spatula attachment generally designated by reference numeral 10, according to a preferred embodiment of the present invention. The spatula attachment 10 has a spatula portion 12 which is curved to effectively scrape food from the inside surface of a mixing bowl. The spatula portion 12 is formed by a bend 18 in a base 20. The base has a pair of slots 50, 52 that open towards the back of the base 20. A lip 21 is formed as a short wall that extends upward from the base 20 and traces the rear edge of the base 20, between and including the slots 50, 52. The spatula portion has curves slightly inward at its bottom 16 and rear 14 edges.

A pair of prongs 30, 32 extend upwardly from the rear edge of the base 20 between the slots 50, 52. The presence of the lip 21 at the intersection of the prongs 30, 32 and the base 20 provides stability and limits the flexibility of the prongs 30, 32 near the base 20. Each prong 30, 32 has a protrusion 37, 38 formed on its outside edge. Each prong also has a reinforcing member 31, 33 extending perpendicular from the front face of the prong 30, 32.

At the end of each prong 30, 32 is a gripping portion 40, 42 forming a small notch 41, 43. The two notches 41, 43 open away from each other in opposite directions.

Figure 2:
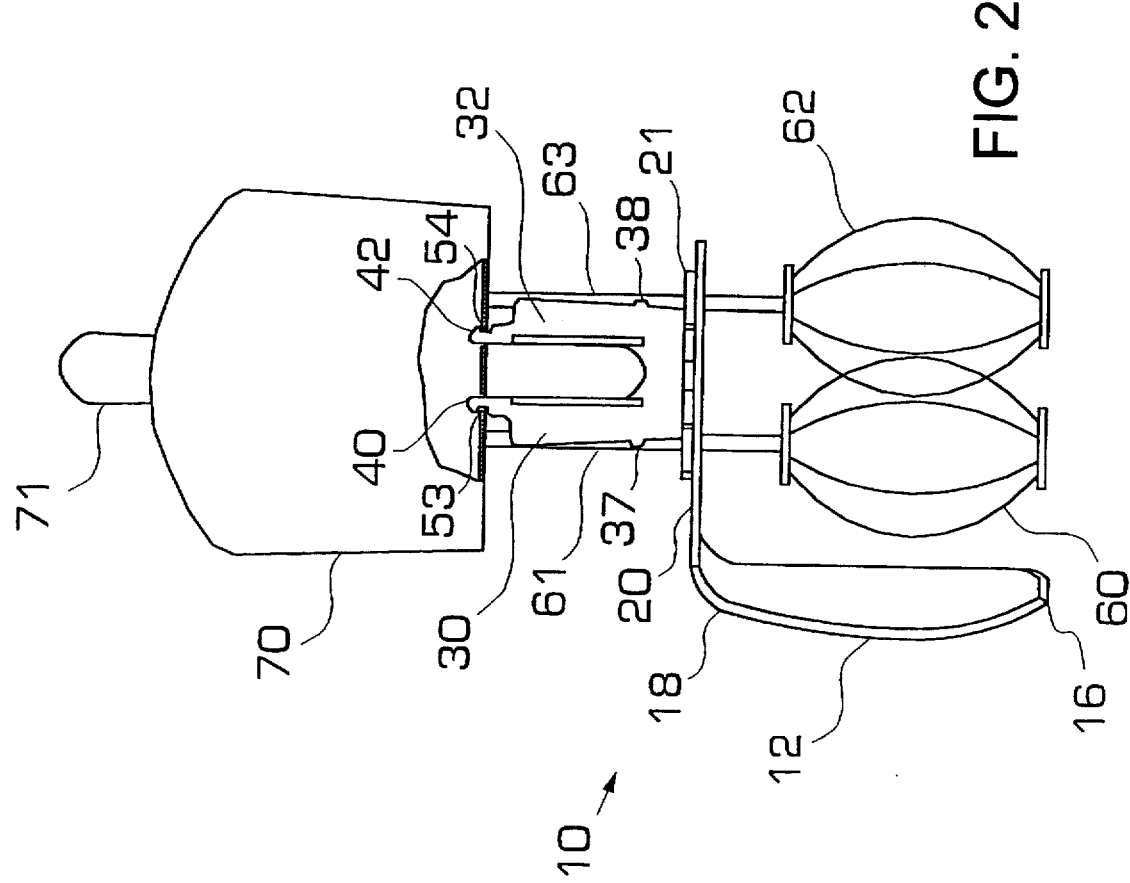
FIG. 2 is a front view of the spatula attachment of FIG. 1 shown connected to a hand-held electric mixer.

FIG. 2 is a front view of the spatula attachment 10 of FIG. 1 connected to a hand-held electric mixer. The mixer has a handle 71 attached to the mixer body 70. A pair beater heads 60, 62 are connected to beater stems 61, 63 extending from the bottom of the mixer body 70. The beater stems 61, 63 extend past the base 20 and the heads 60, 62 are located next to the spatula portion 12 of the attachment 10. The mixer body includes at least one opening. As can be seen in FIG. 2, the prongs 30, 32 extend into the mixer body 70 through openings 53, 54 such that the gripping portions 40, 42 are inside the mixer body 70. The prongs 30, 32 are axially offset and connect to the mixer body 70 at two locations to provide extra stability to the spatula attachment 10.

The prongs 30, 32 are formed from a flexible material, such as plastic. The prongs 30, 32 are squeezed together by the user and inserted into openings 53, 54 formed on the bottom of the mixer body 70. The reinforcing members 31, 33 can be conveniently used to squeeze the prongs 30, 32 together. The protrusions 32 can be held by the user when moving the prongs 30, 32 toward the mixer body 70. When the released by the user, prongs 30, 32 flex back to their natural position such that the gripping portions 40, 42 and notches 41, 43 engage the mixer body 70. The perpendicular reinforcing members 31, 33 prevent the prongs 30, 32 from flexing toward the front or back of the mixer without preventing them from flexing towards each other when squeezed together. The protrusions 37, 38 also prevent the prongs 30, 32 from bending past the beater stems 61, 63.

Figure 3:
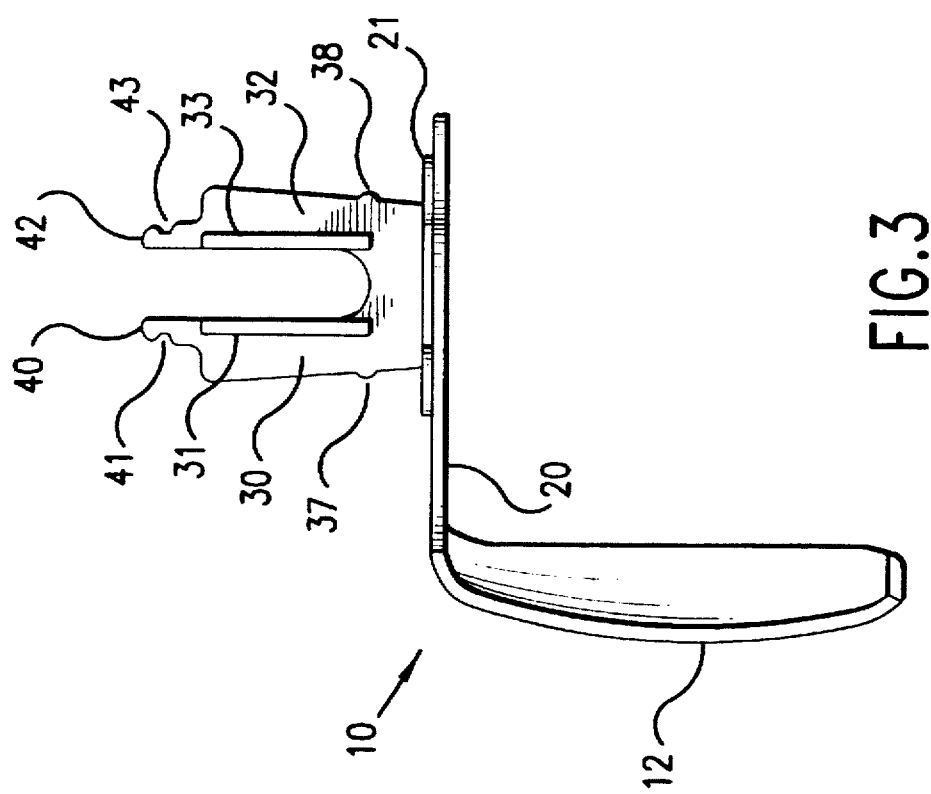
FIG. 3 is a view like FIG. 2, without the mixer.
Figure 4:
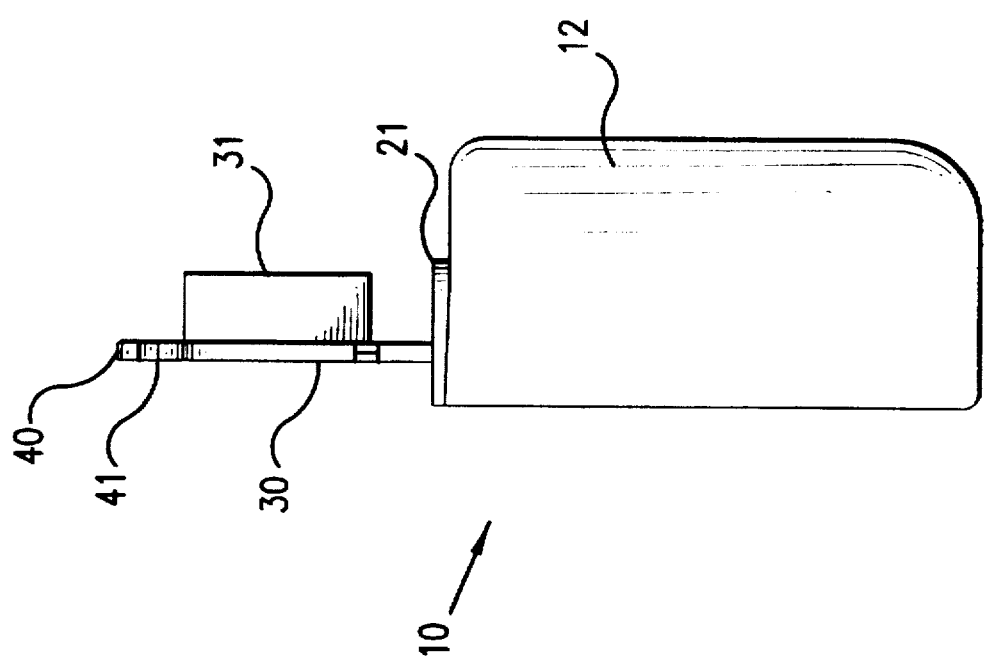
FIG. 4 is a right side view of the spatula attachment shown in FIG. 1.

FIG. 3 is a front view of the spatula attachment 10 shown in FIG. 1. It can be seen how the curve of the side of the spatula portion 12 is formed to match the inside surface of a mixing bowl. FIG. 4, a right side view of the spatula attachment 10, shows how the front top and bottom corners of the spatula portion 12 are also rounded to match the inside surface of a mixing bowl.

Figure 5:
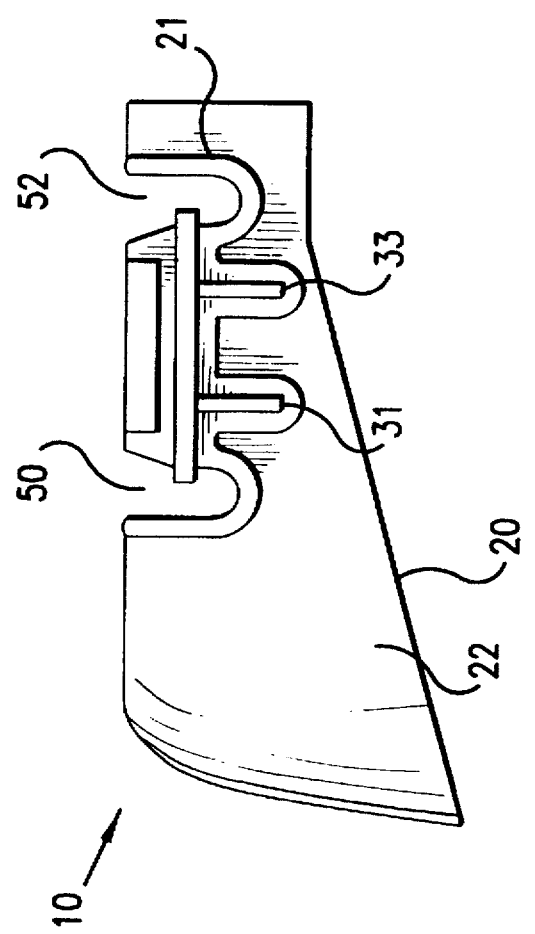
FIG. 5 is a top view of the spatula attachment shown in FIG. 1.

FIG. 5 is a top view of the spatula attachment 10 shown in FIG. 1. It can be seen that the spatula portion 12 has an extended area 22 in the direction in front of the mixer. This area cooperates with the curved edges 14, 16 on the spatula portion 12 and lets a user more effectively scrape the side of a mixing bowl to move the ingredients toward the rotating beaters 60, 62.

Figure 6:
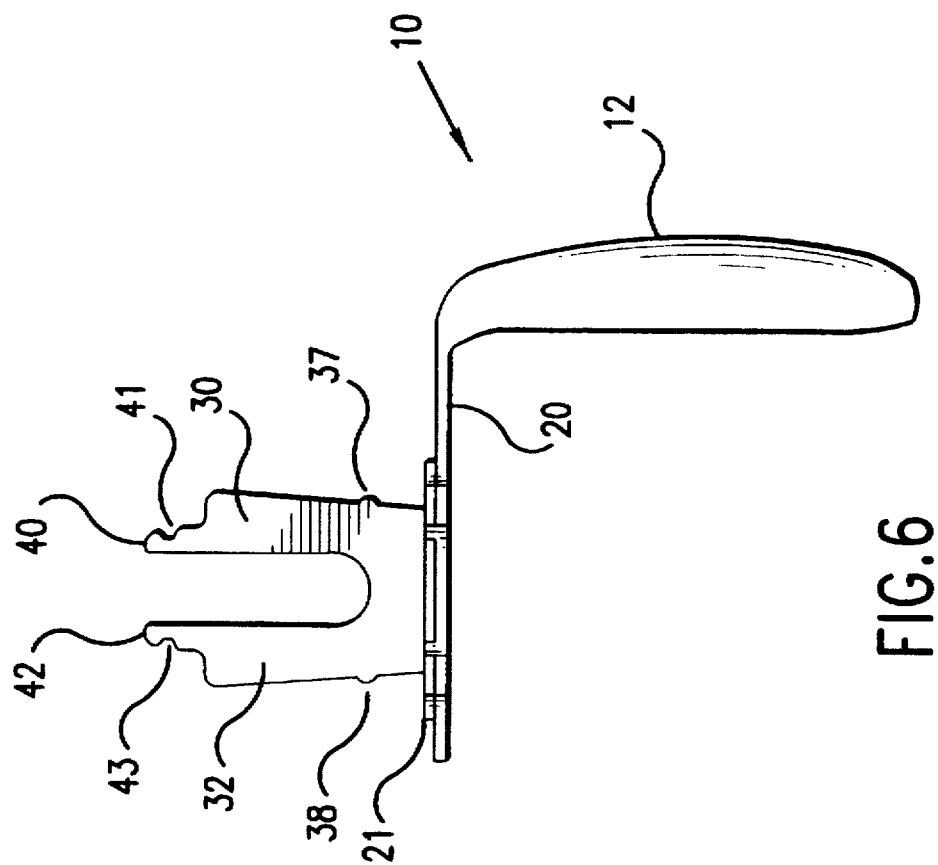
FIG. 6 is a rear view of the spatula attachment shown in FIG. 1.
Figure 7:
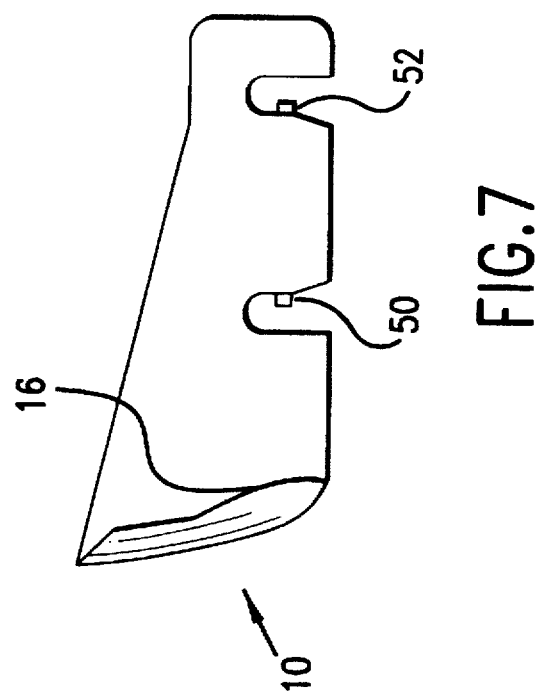
FIG. 7 is a bottom view of the spatula attachment shown in FIG. 1.
Figure 8:
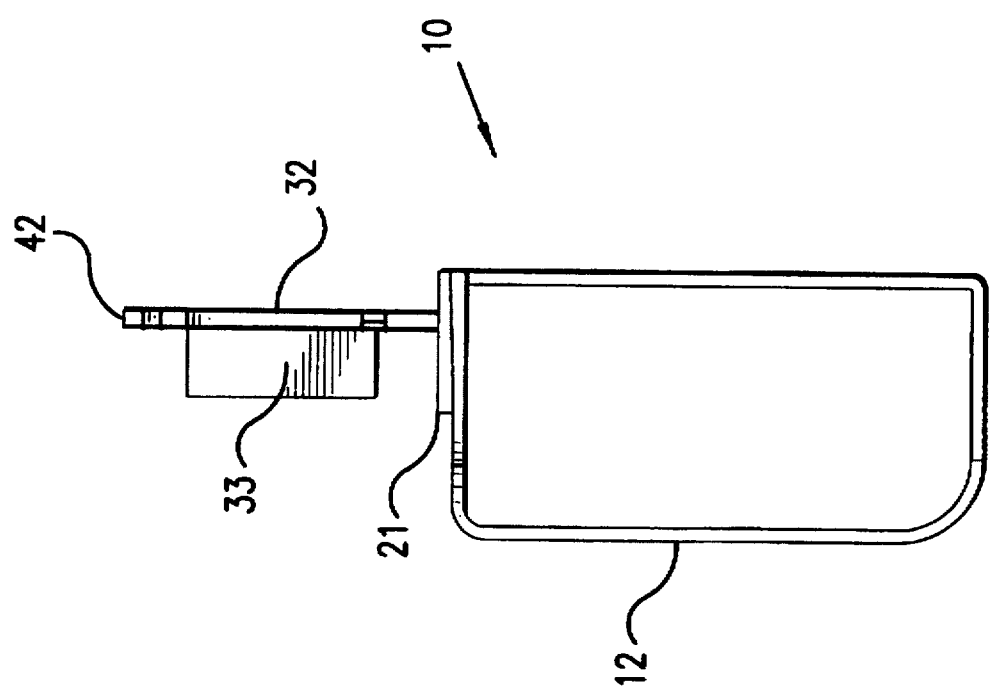
FIG. 8 is a left side view of the spatula attachment shown in FIG. 1.

FIG. 6 is a rear view of the spatula attachment 10 shown in FIG. 1. FIG. 7 is a bottom view of the spatula attachment 10 shown in FIG. 1. FIG. 8 is a left side view of the spatula attachment 10 shown in FIG. 1.

Although a preferred embodiment is specifically illustrated and described herein, it will be appreciated that modifications and variations of the present invention are covered by the above teachings and within the purview of the appended claims without departing from the spirit and intended scope of the invention. For example, a spatula attachment according to the present invention can be made to function with a mixer that has only one beater stem.

What is claimed as new and desired to be secured by Letters Patent of the United States is:

1. A spatula attachment for use with a mixer, comprising:
   a spatula portion;
   a base attached to said spatula portion having a number of slots; and
   a number of prongs extending from said base wherein each of said number of prongs has a notch, the notches opening vertically and being in a common plane generally parallel, and spaced apart from, a plane of said base.

2. A spatula attachment according to claim 1, wherein said number of prongs is 2.

3. A spatula attachment according to claim 1, wherein said number of prongs are made of plastic.

4. A hand held mixer comprising:
   a mixer body having at least one opening;
   a number of beater stems extending from said mixer body; and
   a spatula attachment, comprising:
      a spatula portion,
      a base attached to said spatula portion having a number of slots equal to said number of beater stems, said number of slots allowing said number of beater stems to extend past said base,
      a number of prongs extending from said base, and
      a gripping portion formed on each of said number of prongs opposite said base that fit within said at least one opening in said mixer body.

5. A hand held mixer according to claim 4, wherein said number of beater stems is 2.

6. A hand held mixer according to claim 4, wherein said number of prongs is 2.

7. A hand held mixer according to claim 4, wherein said number of prongs are made of plastic.

8. A hand held mixer according to claim 4, wherein each said gripping portion includes a notch.

9. A mixer, comprising:
   a mixer body having at least one opening;
   a number of beater stems extending from said mixer body; and
   a spatula attachment, comprising:
      a spatula portion;
      a base attached to said spatula portion having a number of slots equal to said number of beater stems, said number of slots allowing said number of beater stems to extend past said base;
      at least two prongs extending from said base, said prongs being parallel and laterally offset from each other prong; and
      a gripping portion formed on each of said prongs opposite said base that fit within said at least one opening in said mixer body, each said gripping portion contacting said mixer body at separate locations.

* * * * *